US009689522B2

(12) United States Patent
Bichler

(10) Patent No.: US 9,689,522 B2
(45) Date of Patent: Jun. 27, 2017

(54) LINING ELEMENT, AND METHOD OF MANUFACTURING A LINING ELEMENT

(71) Applicant: Trelleborg Pipe Seals Duisburg GmbH, Duisburg (DE)

(72) Inventor: Andreas Bichler, Ebbs/Tirol (AT)

(73) Assignee: TRELLEBORG PIPE SEALS DUISBURG GMBH (DE)

( * ) Notice: Subject to any disclaimer, the term of this patent is extended or adjusted under 35 U.S.C. 154(b) by 50 days.

(21) Appl. No.: 14/728,244

(22) Filed: Jun. 2, 2015

(65) Prior Publication Data

US 2015/0338014 A1 Nov. 26, 2015

Related U.S. Application Data

(63) Continuation-in-part of application No. 13/580,234, filed as application No. PCT/EP2011/052839 on Feb. 25, 2011.

(30) Foreign Application Priority Data

Feb. 26, 2010 (DE) .................... 10 2010 009 412

(51) Int. Cl.
| F16L 55/165 | (2006.01) |
| F16L 55/16 | (2006.01) |
| F16L 55/179 | (2006.01) |
| F16L 55/163 | (2006.01) |
| B23P 11/00 | (2006.01) |
| B32B 37/12 | (2006.01) |
| B29C 63/34 | (2006.01) |
| B29C 53/38 | (2006.01) |
| B29L 23/00 | (2006.01) |

(52) U.S. Cl.
CPC ......... *F16L 55/1651* (2013.01); *F16L 55/179* (2013.01); *B29C 53/385* (2013.01); *B29C 63/34* (2013.01); *B29L 2023/006* (2013.01); *F16L 55/163* (2013.01); *F16L 55/1656* (2013.01); *Y10T 29/49826* (2015.01); *Y10T 156/10* (2015.01)

(58) Field of Classification Search
CPC ... F16L 55/163; F16L 55/179; F16L 55/1651; F16L 55/1656; B29C 63/34; B29C 53/385; B29L 2023/006; Y10T 29/49826; Y10T 156/10
USPC ..................................... 138/97–99
See application file for complete search history.

(56) References Cited

U.S. PATENT DOCUMENTS 4,686,126 A * 8/1987 Hyodo .................... F16L 11/02
   138/97
5,351,720 A * 10/1994 Maimets ................. F16L 55/18
   138/98
5,780,123 A * 7/1998 Kamiyama ......... B29C 66/1142
   138/150

(Continued)

*Primary Examiner* — Frederick C Nicolas
(74) *Attorney, Agent, or Firm* — Dickinson Wright PLLC

(57) ABSTRACT

The invention relates to a lining element for repairing a connection area between a main pipe and a branch pipe, the lining element including a layer of resin-absorbing material, wherein at least six flexible, expandable lining parts are connected to each other by at least six connections to form the lining element. To manufacture such a lining element the at least six flexible, expandable lining parts are provided and connected to each other by at least six connections to form the lining element.

18 Claims, 13 Drawing Sheets

(56) References Cited

U.S. PATENT DOCUMENTS

| | | | | |
|---|---|---|---|---|
| 5,915,419 A * | 6/1999 | Tweedie | ................ | F16L 55/179 |
| | | | | 138/97 |
| 6,948,883 B2 * | 9/2005 | Osibamowo | .......... | F16L 55/179 |
| | | | | 138/93 |
| 9,353,900 B2 * | 5/2016 | Bichler | ............... | F16L 55/1656 |
| 9,568,139 B2 * | 2/2017 | Muhlin | ................ | F16L 55/179 |
| 2004/0016467 A1 * | 1/2004 | Blackmore | ........... | F16L 55/179 |
| | | | | 138/99 |
| 2004/0161301 A1 * | 8/2004 | Osibamowo | .......... | F16L 55/179 |
| | | | | 405/150.1 |
| 2005/0133105 A1 * | 6/2005 | Criffo' | ................ | F16L 55/1654 |
| | | | | 138/98 |
| 2012/0312407 A1 * | 12/2012 | Muhlin | ................ | F16L 55/179 |
| | | | | 138/98 |

* cited by examiner

LINING ELEMENT, AND METHOD OF MANUFACTURING A LINING ELEMENT

CROSS-REFERENCE TO RELATED APPLICATIONS

The present application is a continuation-in-part of U.S. patent application Ser. No. 13/580,234, which is a Section 371 National Stage application of international application PCT/EP11/52839, filed 25 Feb. 2011, which claims the benefit of priority from German patent application 10-2010-009-412.9, filed 26 Feb. 2010, the disclosures of which applications are incorporated herein by reference in their entireties.

FIELD OF THE INVENTION

The present invention relates to a lining element and a method of manufacturing a lining element. The lining element is used for repairing a connection area between a main pipe and a branch pipe.

BACKGROUND

Lining elements are used for repairing pipes, in particular main pipes, branch pipes and house connection lines in the area of the sewerage system, and also in the area of buildings. By introducing the lining elements, leaking pipe sections, in particular of pipe joint sections, can be repaired. The lining element is provided with an adhesive glue for durable bonding with the interior of the tube wall, wherein, in particular, a hardenable resin is used. Typically, the lining element comprises a layer of resin-absorbing material, in particular a non-woven, or fibrous material. Prior to insertion of the lining element, the latter is impregnated with the resin, and then the lining element is brought into its final position at the area to be repaired. Usually, the well-known inversion methods are used. After the resin has hardened, the lining element is in positive and frictional engagement with the inner tube wall. This approach is often necessary at pipe junctions where two pipes meet.

For the manufacture of the lining element it is known from US 2008/0078463 A1 that the branch tube section of a hat-shaped lining element is rolled from an initially planar portion to a tube-like shape, and then the facing side edges are sewn together. Subsequently, the seam can be covered by a masking tape. A similar approach is known from U.S. Pat. No. 5,915,419, where the tube-like section provided for lining the branch pipe is provided by rolling it and connecting the facing edges by means of a seam. Subsequently, a rim is connected to this tube-like section by means of an adhesive bond.

In this manufacturing method, it is a proven drawback that the branch pipe section and the main pipe section of the lining element must be connected by an annular seam. The creation of such a radial seam is very complex and requires sewing along a circular path.

SUMMARY OF THE DISCLOSURE

All lining elements mentioned in the present invention can also be referred to as liners, repairing elements or pipe lining elements. Basically, such a lining element can have a one- or multi-part configuration. The term "lining part" should thus refer to a section of the lining element or a material part, in particular. In one form, the lining parts are of the same material. The lining parts can have a one- or multi-layer configuration.

The inventive lining element according to claim 1 is used for repairing a connection area between a main pipe and a branch pipe and comprises a layer of resin-absorbing material and at least three flexible, extendable lining parts, which are connected to each other by at least three connections to form the lining element.

In one embodiment, the number of connections is the same as the number of lining elements. For example, three connections are used for three lining parts, four connections are used for four lining parts, five connections are used for five lining parts, etc. The number of lining parts, and thus the number of connections, can be chosen, for example, according to the flexibility and/or expandability of the material used for the lining part, in particular with respect to the resin-absorbing layer. Furthermore, the size of the pipe diameter of the main pipe or branch pipe to be repaired can influence the number of lining parts, since a larger number of lining parts seems, for example, a better choice for larger pipe diameters.

According to one feature, the respective connection is formed by a seam and/or adhesive connection essentially extending along the adjacent side edges of the lining parts. In one form, this connection extends continuously from one end of the lining element to the other end of the lining element. Thus, this could also be referred to as a longitudinal connection, or a longitudinal seam.

Each lining part can comprise a main pipe section and a branch pipe section. In the installed position, the main pipe section can be in snug contact with the main pipe, and the branch pipe section can be in snug contact with the branch pipe. The main pipe section can be a rim or a ring, i.e. a section only covering a short portion of the main pipe around the joint sections of the branch pipe. As an alternative, the main pipe section can be a pipe-shaped section which, in the installed position, completely covers the main pipe in the circumferential direction and over a certain length along the main pipe.

In one embodiment, the lining parts are connected to each other by continuously connecting both the side edges of the adjacent branch pipe sections and the side edges of adjacent main pipe sections. By these means, a continuous connection can be achieved. The respective side edge sections of adjacent branch pipe sections and the side edge sections of adjacent main pipe sections can be connected to each other. In particular if these sections have a rectilinear configuration, the side edge sections can be easily sewn and/or glued together.

Furthermore, the branch pipe sections can be connected to a branch pipe extension by means of at least one connection which comprises at least one flexible, expandable lining part. The branch pipe can, for example, be a house connection line. In its installed position, the branch pipe extension is in snug contact with the branch pipe and can have, for example, a length of up to 20 m or more.

In one embodiment, the branch pipe extension is formed of a flat sheet material by rolling it and establishing a connection along the longitudinal edges of the at least one lining part, and connected to the branch pipe sections by means of at least one seam and/or adhesive connection. This seam and/or adhesive connection can extend essentially radially in the circumferential direction with respect to the branch pipe extension. By these means, the branch pipe extension can be connected to the branch pipe section by using a radial seam.

A further inventive lining element according to claim 12 is used for repairing of a connection area between a main pipe and a branch pipe and comprises a layer of resin absorbing material, and at least six flexible, expandable lining parts are connected to each other by at least six connections to form the lining element. Because of its at least six connections the lining element comprises less steam derivation and therefore, the lining element has an improved impermeability. Moreover, when cutting the at least six flexible, expandable lining parts out of a flat sheet material less cutout waste is generated and therefore, the lining element is cost efficient to manufacture.

According to one form, the number of connections is equal to the number of lining parts. For example, six connections are used for six lining parts. The number of lining parts, and thus, the number of connections, can be chosen, for example, according to the flexibility and/or expandability of the material used for the lining part, in particular with respect to the resin absorbing layer. Furthermore, the size of the pipe diameter of the main pipe or branch pipe to be repaired can influence the number of lining parts, since a larger number of lining parts seems, for example, a better choice for larger pipe diameters.

In one embodiment, the at least six flexible, expandable lining parts are connected to each other by at least seven connections to form the lining element.

In one form, the respective connection is formed by a seam or adhesive connection essentially extending along adjacent side edges, side edge sections and/or end edges of the lining parts. Per one feature, this connection extends continuously from one end of the lining element to the other end of the lining element. Thus, this could also be referred to as a longitudinal connection, or a longitudinal seam.

In one embodiment, at least four lining parts comprise a branch pipe section and a rim pipe section and that the at least two other lining parts comprise a main pipe section. In the installed position, the at least four lining parts comprising a branch pipe section and a rim pipe section are in contact with the branch pipe and/or the connection area between the main pipe and the branch pipe, wherein the two lining parts comprising the main pipe section are only in snug contact with the main pipe. The rim pipe section can be a rim or a ring, i.e. a section only covering a short portion of the main pipe around the joint sections of the branch pipe. The main pipe section can be a pipe-shaped section, which, in the installed position, completely covers the main pipe in the circumferential direction and over a certain length along the main pipe.

Per one aspect, the lining parts having a branch pipe section and a rim pipe section are connected to each other by connecting both the side edges of adjacent branch pipe sections and the side edges and/or side edge sections of adjacent rim pipe sections in a continuous fashion. By these means, a continuous connection can be achieved. In particular, if these edges and/or sections have a rectilinear configuration, the side edge and/or side edge sections can be easily seamed and/or glued to each other.

Furthermore, each of the lining parts having a main pipe section is connected with one of its side edges to at least two side edges and/or side edge sections of adjacent rim pipe sections and to at least one side edge and/or end edge of an adjacent rim pipe section in a continuous fashion.

In one embodiment, at least two of the lining elements having a branch pipe section and a rim pipe section comprise a nearly rectangular shape. When cutting the two lining elements having a branch pipe section and a rim pipe section out of a flat sheet material less cutout waste is generated.

According to one feature, at least two of the lining parts having a branch pipe section and a rim pipe section comprise a first rectangular section and a second rectangular section, wherein the first rectangular section is larger than the second rectangular section. Preferably, in the installed position, the first rectangular section can be in snug contact with the connection area between the main pipe and the branch pipe, in particular with the rim section and/or ring section of the main pipe, and the second rectangular section can be in snug contact with the branch pipe.

Furthermore, by means of at least one connection, the branch pipe sections can be connected to a branch pipe extension comprising at least one flexible, expandable lining part. The branch pipe extension can, for example, be a house connection line. In its installed position, the branch pipe extension is in snug contact with the branch pipe and can have, for example, a length of up to 20 m or more.

In one embodiment, the branch pipe extension is formed of a flat sheet material by rolling it and establishing a connection along the longitudinal edges of the at least one lining part, and connected to the branch pipe section by means of at least on seam and/or adhesive connection. This seam and/or adhesive connection can extend essentially radially in the circumferential direction with respect to the branch pipe extension. By these means, the branch pipe extension can be connected to the branch pipe section by using a radial seam.

A further inventive lining element is characterized by at least one lining part comprising a layer of resin-absorbing material and a tube-shaped preform which is able to be formed by means of heat and/or deforming to result in a tubular final shape.

This lining element can also be referred to as a semi-finished lining element, since it does not jet have its final shape, which corresponds to the geometric shape of the section to be repaired.

According to one feature, the at least one lining part can have a preform comprising an arcuate contour. In particular, at least one side edge of the lining part can have an arcuate configuration. In its preform, the lining part and/or the lining element can have a conical form, for example.

In one embodiment, the preform comprises an arcuate contour. In particular, the preform can have a conical form. Similarly, the final shape can also be formed in such a manner wherein, however, the geometric dimensions are different to those of the preform. This difference arises in the forming process, for example by stretching or straining.

In one embodiment, the lining element is formed of a single lining part, wherein this lining part can be formed in one piece without a connection, or in one piece by means of at least one connection, preferably in the form of a seam. In the one-piece embodiment of the lining part having at least one connection, the tubular preform can be made from an initial flat, planar material piece by means of rolling.

In another embodiment, at least two lining parts are provided that are connected to each other. This connection can be achieved, for example, by means of at least one seam and/or an adhesive bond.

The embodiments described in the following apply to all above-explained lining elements according to the present invention.

The layer of resin-absorbing material provided for the lining element may comprise a fibrous material, a non-woven material and/or a knitted spacing material. The layer of resin-absorbing material can thus comprise, in particular, glass fibers, polyester fibers, polypropylene fibers, carbon fibers and/or aramid fibers. For example, needled polyester non-wovens, glass non-wovens, blends of glass fibers (cut roving) and thermoplastic fibers (hybrid rovings), such as PP, PES, carbon fibers or aramid fibers, and combinations of the above-mentioned components can also be used.

Furthermore, the lining part can comprise a plastic film as a fluid-impermeable layer, such as, by way of non-limiting example, a film of PVC or thermoplastic polyurethane. Such a coating can be applied by laminating or by means of a calendar on the layer of resin-absorbing material.

In another embodiment, the lining element comprises at least one reinforcing element, in particular a reinforcing ring. This reinforcing element is, per one feature, attached to the lining element in the area of one of its ends, in particular in the area of the rim. For attachment, for example, an adhesive connection can be provided. In one form, the reinforcing element is a reinforcing ring of plastic material. The reinforcing element makes it possible that the main pipe parts of the lining area form a dimensionally stable, flat area.

A needled knitted spacing material can also be used for the resin-absorbing layer. Such a knitted spacing material comprises, for example, a double-layer textile, wherein the textile layers are kept at a distance by means of linking fibers (pile fibers). To achieve bonding of the fibers after the forming/deforming process, a thermoplastic consolidation of the layer is carried out on the basis of components having suitable qualities (plastic fibers or powder binders). In order to achieve this consolidation, a coating, such as a film, can also be additionally or alternatively applied.

Furthermore, the at least one lining part can have a first thickness in a first section and a second thickness in a second section. In particular, the layer of resin-absorbing material has varying material thicknesses. The varying thicknesses are, in one form, adapted to the desired final shape of the lining element and the deformation behavior of the layer of resin-absorbing material. The position and extension of the sections having varying thicknesses can also be chosen in a manner adapted thereto. In the transition area between a section to be applied to the main pipe and a section to be applied to the branch pipe, in particular, a smaller thickness is selected than in other areas to provide and/or increase the required deformation ability of the transition area.

The inventive method according to claim 26 for the manufacture of a lining element for repairing a connection area between a main pipe and a branch pipe may be used to manufacture the lining element according to the apparatus claims.

In this method according to the present invention for the manufacture of a lining element, at least three flexible, expandable lining parts having a layer of resin-absorbing material are provided. The at least three lining parts are connected to each other by means of at least three connections to form the lining element.

In a further development, the number of connections is equal to the number of lining parts.

Furthermore, the respective connection can be formed by a seam and/or adhesive connection essentially extending along the adjacent side edges of the lining parts. According to one feature, the sewing and/or gluing is carried out continuously from one end of the lining element to the other end of the lining element, so that a simple continuous joining process is achieved.

The lining parts can be connected to one another by connecting both the side edges of the adjacent branch pipe sections and the side edges of adjacent main pipe sections in a continuous manner. The respective side edge sections of adjacent branch pipe sections and the side edge sections of adjacent main pipe sections can be connected to each other.

By these means, a continuous connection can be achieved. If these sections have a rectilinear configuration, in particular, the side edge sections can be simply sewn and/or glued to each other.

Furthermore, it can be provided that the branch pipe sections of the lining element are connected to a branch pipe extension by means of at least one connection, which comprises at least one flexible, expandable lining part. The branch pipe can, for example, be a house connection line. In its installed position, the branch pipe extension is in snug contact with the branch pipe and can have a length, for example, of 20 m or more.

In a variant of the method, the branch line extension is formed of a flat sheet material by rolling it and establishing a connection along the longitudinal edges of the at least one lining part, and is connected to the branch pipe sections by means of at least one seam and/or adhesive connection, so that this seam and/or adhesive connection preferably extends essentially radially in the circumferential direction with respect to the branch pipe extension. The branch pipe extension can thus be connected to the branch pipe section by means of a radial seam.

The inventive method according to claim 32 for the manufacture of a lining element for repairing a connection area between a main pipe and a branch pipe may be used to manufacture the lining element according to claim 12 and the associated further developments.

In this method according to the present invention for the manufacture of a lining element, at least six flexible, expandable lining parts having a layer of resin absorbing material are provided, wherein at least four lining parts comprise a branch pipe section and a rim pipe section and the at least two other lining elements comprise a main pipe section. The at least six lining parts are connected to each other by means of at least six connections to form the lining element.

Per one feature, the at least six flexible, expandable lining parts are connected to each other by at least seven connections to form the lining element.

Furthermore, the respective connection can be formed by a seam and/or adhesive connection essentially extending along the adjacent side edges, side edge sections and/or end edges of the lining parts. According to one feature, the sewing and/or gluing is carried out continuously from one end of the lining element to the other end of the lining element, so that a simple continuous joining process is achieved.

The lining parts having a branch pipe section and a rim pipe section can be connected to each other by connecting both the side edges of adjacent branch pipe sections and the side edges and/or side edge sections of adjacent rim pipe sections in a continuous fashion. By these means, a continuous connection can be achieved. If these side edges and/or side edge sections have a rectilinear configuration, in particular, the side edges and/or side edge sections can be simply sewn and/or glued to each other.

According to one feature, each of the lining parts having a main pipe section is connected with one of its side edges to at least two side edges and/or side edge sections of adjacent rim pipe sections and to at least one side edge and/or end edge of an adjacent rim pipe section in a continuous fashion.

Furthermore, it can be provided that the branch pipe sections of the lining elements are connected to a branch pipe extension by means of at least one connection, which comprises at least one flexible, expandable lining part. The branch pipe can, for example, be a house connection line. In its installed position, the branch pipe extension is in snug contact with the branch pipe and can have a length, for example of 20 m or more.

In one variant of the method, the branch line extension is formed of a flat sheet material by rolling it and establishing a connection along the longitudinal edges of the at least one lining part, and is connected to the branch pipe sections by means of at least one seam and/or adhesive connection, so that the seam and/or adhesive connection extends essentially radially in the circumferential direction with respect to the branch pipe extension. The branch pipe extension can thus be connected to the branch pipe section by means of a radial seam.

The lining element comprising a layer of resin-absorbing material and a tube-shaped preform which is able to be formed by means of heat and/or deforming to result in a tubular final shape may be manufactured by means of the following inventive method for the manufacture of a lining element. At least one tube-like pre-formed lining part, having a layer of resin-absorbing material is provided in this inventive method according to claim 22 for the manufacture of a lining element. Subsequently, the tube-like pre-formed lining part is deformed by means of heat and/or forming to give the at least one lining part its final shape.

The tube-like pre-formed lining part can be provided in its tube-shaped pre-form either by providing the layer of resin-absorbing material, in particular fibrous material, non-woven and/or knitted spacing fabric, in one seamless material piece in the shape of a tube or by using a seamless planar material piece, and then rolling and sewing it to create the tubular preform. For example, a felt part can be integrally manufactured in one piece, such as by means of wet felting and/or fulling, if a fibrous planar part is used on the basis of felt material.

"Forming" in the context of the present invention, refers to an intentional permanent shape change. This may be carried out using pressure, tension and/or heat and comprises, in particular, lengthening and/or widening. Forming can also be referred to as deforming. A setting process, which will be described in more detail below, may be carried out to maintain the final shape after forming. A material for the resin-absorbing layer of the lining part and the lining element is chosen overall which is sufficiently expandable to enable subsequent forming. Prior to or after the setting process, the at least one lining part can be cut. Furthermore, it can be provided that an end area, for example, of the at least partially pre-formed lining part is deformed to form a rim for a hat-shaped lining element. For this purpose, a conical preform can be provided, for example, for the tube-shaped pre-formed lining part. The final shape produced by forming may still be conical, but it has different geometric dimensions, it has, for example, been expanded. Furthermore, it is possible to provide a certain section of the lining element by bending or folding to form a tube section with the desired orientation. Generally, a first tubular section can form a branch pipe section of the lining part, and a second tubular section can form a main pipe section of the lining element. For example, a section of the lining element can be used for forming a rim.

Furthermore, the lining part can be used with different thicknesses, so that different forming behavior or deformation behavior can be achieved at different parts. The material thickness of the layer of resin-absorbing material can have a first thickness in a first section of a lining part (for example the eventual rim section) and the material thickness of the layer of resin-absorbing material can have a second thickness in the second section of the lining part (for example the eventual rim section), which are different and are adapted to the deformation behavior required to produce the final shape. "Final shape" refers to that form of the lining element which it has prior to being glued to the section of the pipe to be repaired. This final shape may be adapted to the geometric preconditions of the section to be repaired in such a manner that the formed sections of the lining element can be positioned and fixed to the corresponding sections of the pipe inner walls of the main pipe and/or the branch pipe in the course of the repair process. The final shape can have various geometric shapes to enable its use for various pipe joints. Generally, a first pipe section of the lining part, for example a branch pipe section, can extend at an angle of about 30° to 90° with respect to a further pipe section of the lining part, for example a main pipe section.

In a preferred embodiment, the forming or deforming is carried out by expanding the lining part. The expansion process can be carried out, for example, by slipping the lining part onto a forming body. A forming body can be, for example, a conical body. Alternatively or additionally to expanding, folding and/or bending can also be carried out. When slipped on, pressure and/or tension can be applied to the lining part, shaping the geometric form of the preform to the desired final shape required for later lining of the pipe. Herein, the lining part is stretched or strained, in particular.

In the exemplary embodiment, the lining part is formed by means of heat, by applying steam, in particular hot steam. To achieve this, the above mentioned forming body can have openings through which steam exits and can flow through the layer of resin-absorbing material. According to this embodiment, the forming process is carried out by means of both heat by the application of steam, and expansion, bending and/or folding of the lining part, for example in the manner described above.

Furthermore, the final form of the lining part can be set and/or consolidated during forming or after forming by means of cooling and/or by the application of a binder, such as in the form of a powder or in the form of a coating. Cooling is carried out, in particular, if the forming process is carried out with the application of heat. The binder can be applied prior to or after forming. The binder can be, in particular, a powder binder or plastic fibers, added to the layer of resin-absorbing material in advance or subsequently. For example, a powder binder can be sprinkled onto the layer of resin-absorbing material after the preform has been provided, so that the powder settles in the spaces of the layer. This can then be heated so that the binder is activated in such a manner that there is a thermoplastic consolidation. In this variant, forming by means of steam is not required. Furthermore, a coating in the form of a film or the like can be used in addition or alternatively as a binder.

In another embodiment, at least one lining part is provided with a predetermined contour, in particular by cutting, wherein the contour is formed in such a manner that the lining part can be preformed to its tubular preform shape and later can be shaped into its final form by a predetermined degree. A planar, flat piece of material for the layer of resin-absorbing material can be cut to a predetermined contour, for example, and then the initially planar lining part can be formed into the tubular preform shape by means of rolling. Subsequently, the tubular preformed lining part can be formed into its final shape, for example, by slipping it onto a forming body.

In a further exemplary embodiment, a plurality of lining parts is connected to each other to form a tubular preformed lining element. For example, two planar lining parts can be brought into the form of a half shell, whereupon these half shells can be connected at the edge sections, in particular at their side edges. This connection can be achieved by means of at least one seam and/or an adhesive glue. For fixing and/or sealing the connection area, an adhesive tape or masking tape can be used.

Furthermore, it can be provided that at least two of the edge sections of a lining part can be connected which results in a tubular lining element. For instance, two side edges, in particular the longitudinal edges, of the lining part are connected to each other. These edge sections or side edges can be connected in an adjacent or overlapping relationship.

BRIEF DESCRIPTION OF THE DRAWINGS

The method according to the present invention and the lining element according to the present invention will be explained in more detail in the following with reference to the accompanying drawings, wherein.

WRITTEN DESCRIPTION

Figure 1:
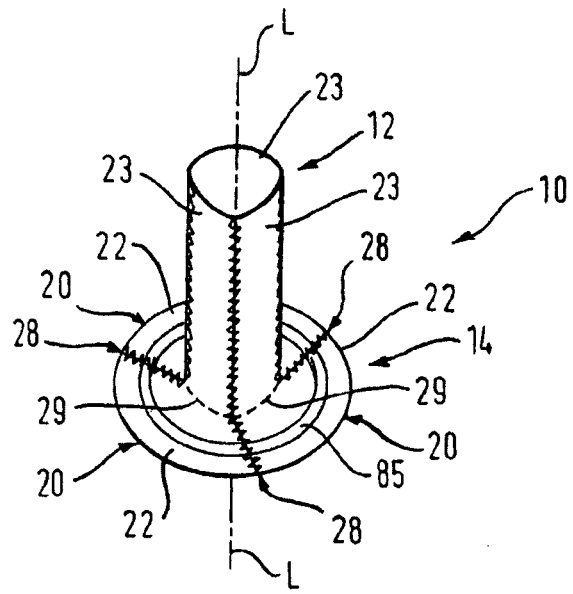
FIG. 1 is a first perspective view of a first lining element of three lining parts.
Figure 2:
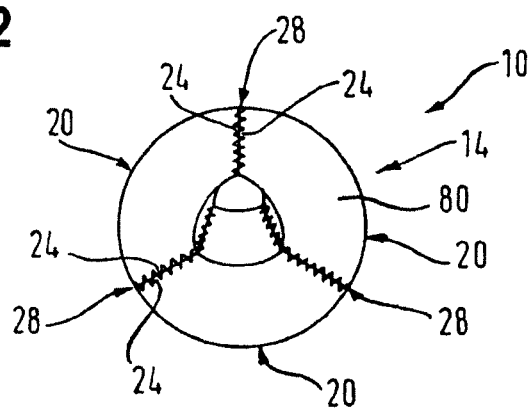
FIG. 2 is a second perspective view of the first lining element of FIG. 1.
Figure 3:
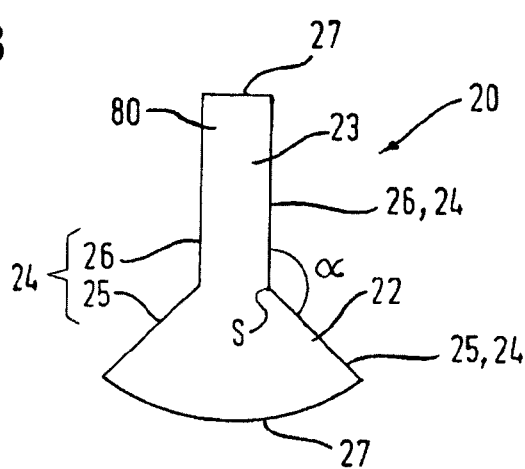
FIG. 3 is a plan view of the planar initial shape of the lining part of FIGS. 1 and 2.

FIGS. 1 to 3 show a first lining element 10 for repairing a joint area between a main pipe and a branch pipe. FIG. 1 is a first perspective view, and FIG. 2 is a further perspective view of first lining element 10 shown from below, and essentially along a longitudinal direction L. Lining element 10 consists of three lining parts 20, essentially extends along the longitudinal direction L, and essentially has the shape of a hat. FIG. 3 is a plan view of the initial form, cut to size, for the initially flat, planar lining part 20 as an initial element for lining element 10.

As seen in the longitudinal direction L, lining element 10 comprises a first end 12 and a second end 14. Furthermore, each lining part 20 comprises a main pipe section 22 and a branch pipe section 23, which may be integrally connected. Thus, first end 12 of lining element 10 is formed by branch pipe sections 23 and second end 14 of lining element 10 is formed by main pipe sections 22 of lining parts 20.

To manufacture first lining element 10, three lining parts 20, as shown in FIG. 3 and initially having a planar, flat configuration, are cut to size and prepared. All three lining parts 20 essentially have the same geometric shape formed by two end edges 27 and two side edges 24. End edges 27, in the finished state, form first end 12 and second end 14 of lining element 10 as seen in the longitudinal direction L. The two side edges 24 are each subdivided into a first side edge section 25 and a second side edge section 26, each essentially having a rectilinear configuration, and converging to a point of intersection while defining a predetermined angle α. First side edge section 25 is associated with main pipe section 22 and second side edge section 26 is associated with branch pipe section 23.

The three planar, flat lining parts 20 are connected to each other by means of three connections 28 to form lining element 10. According to the illustrated embodiment, each connection 28 is achieved by means of sewing and/or gluing. However, other alternatives for joining lining parts 20 are also possible.

To achieve this, in a first step, two lining parts 20 are positioned side by side in such a manner that adjacent side edges 24 of the two lining parts 20, i.e. their side edge sections 25, 26, are essentially adjacent to each other. Then, these adjacent side edge sections 25, 26 are sewn and/or glued to each other to create a first connection 28. This sewing process can be carried out on a planar support surface, which is much more advantageous than a radial seam. Next, the third lining part can be positioned next to the free side edge 24 of one of the two already connected lining parts 20 in such a manner that one side edge 24 of third lining part 20 is adjacent to a free side edge 24 of the two already connected lining parts 20 or is positioned in a neighboring fashion. Subsequently, these facing side edges 24 are sewn and/or glued together to form a second connection 28. Now, the three lining parts 20 are already connected to each other by means of two connections. As a last step, the three connected lining parts 20 are positioned in such a manner, for example, by slightly bending or folding them, such that the two remaining free side edges 24 come to lie in a side-by-side or adjacent relationship. Hereafter, these two side edges 24 are sewn and/or glued together to form a third connection 28. Finally, the thus formed lining element 10 can be pressed to achieve the hat shape shown in FIG. 1. As a final step, a reinforcing element 85 can be attached to lining element 10 in the area of its second end 14, for example, by means of an adhesive connection (cf. FIG. 1). According to the exemplary embodiment, reinforcing element 85 is a reinforcing ring of plastic material. Reinforcing element 85 enables main pipe sections 22 of lining parts 20 to form a dimensionally stable rim area.

By connecting by means of connections 28, by shaping lining elements 20 connected to each other, and/or by attaching reinforcing element 85, a fold, a kink or a bent area is formed in the transition area from main pipe section 22 to branch pipe section 23 (cf. broken line 29 in FIG. 1). This fold or kink 29 can have a curvilinear or annular configuration or be essentially rectilinear. The three main pipe sections 22 can thus together form a rim or a ring. Furthermore, the three branch pipe sections 23 together can form a kind of sleeve. Main pipe sections 22, in the installed position, i.e. after the repair action, are in snug contact with the main pipe, and branch pipe sections 23, in the installed position, are in snug contact with the branch pipe, such as a house connection line.

Per the illustrated embodiment, the three connections 28 are continuously configured, i.e. starting from one of the two end edges 27 to the other end edge 27. The number of connections 28 thus corresponds to the number of lining parts 20. Each of connections 28 extend along adjacent or facing side edges 24 of lining parts 20. In the case of configuring connection 28 as a seam, this connection 28 can also be referred to as a longitudinal seam.

As an alternative, it can basically also be provided that some of the adjacent side edges 24 overlap, and lining parts 20 form a connection 28 in the overlapping area. Furthermore, if connection 28 is configured as a seam and additional sealing is desired, an adhesive tape or masking tape can be applied to the seam and/or along side edges 24.

Figure 4:
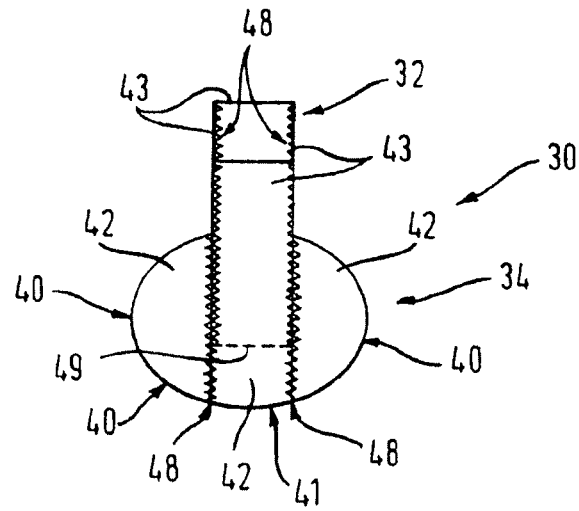
FIG. 4 is a first perspective view of a second lining element of four lining parts.
Figure 5:
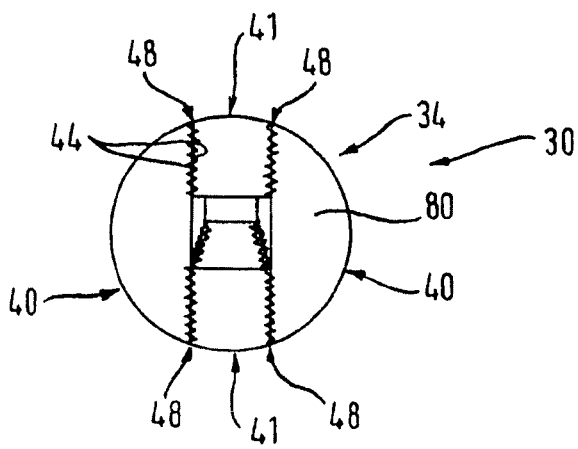
FIG. 5 is a second perspective view of the second lining element of FIG. 4.
Figure 6:
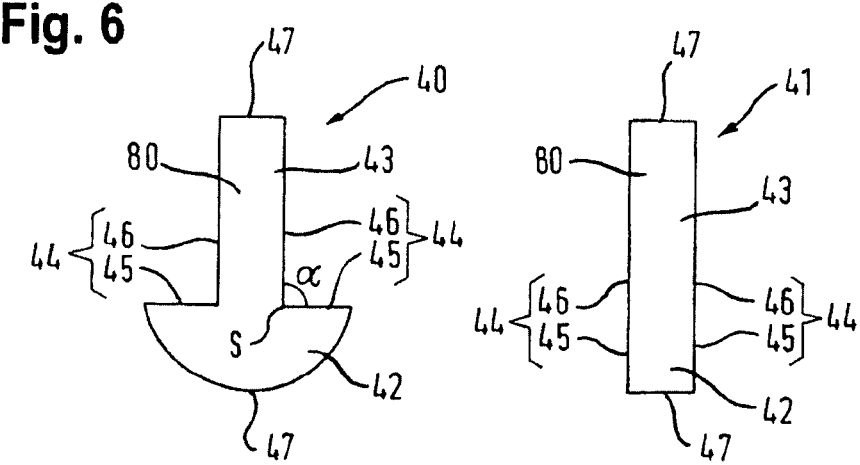
FIG. 6 is a plan view of the planar initial shape of the lining part of FIGS. 4 and 5.

FIGS. 4 to 6 show a second lining element 30 for the repair of a connection area between a main pipe and a branch pipe. In contrast to the embodiment according to FIGS. 1 to 3, the present lining element 30 comprises two different types of lining part, namely lining part 40 and lining part 41 (cf. FIG. 6), as initial elements for the manufacture of lining element 30. FIG. 4 is a first perspective view, and FIG. 5 is a further perspective view of lining element 30 from below and essentially along longitudinal direction L. Lining element 30 consists of two lining parts 40 and two lining parts 41 and thus of a total of four lining parts. As in the first embodiment, it essentially extends along longitudinal direction L and essentially has the shape of a hat. FIG. 6 is a plan view of lining parts 40, 41, cut to size and in a flat, planar configuration, as initial elements for lining element 30.

As seen in longitudinal direction L, lining element 30 comprises a first end 32 and a second end 34. Furthermore, each lining part 40, 41 comprises a main pipe section 42 and a branch pipe section 43, which may be integrally connected to each other. First end 32 of lining element 30 is thus formed by branch pipe sections 43, and second end 34 of lining element 30 is formed by main pipe sections 42 of lining parts 40, 41.

For the manufacture of second lining element 30, two of the initially flat, planar lining parts 40, shown on the left in FIG. 6, and two of the initially flat, planar lining parts 41, shown on the right in FIG. 6, are cut to size and prepared. The two lining parts 40 and the two lining parts 41 each essentially have the same geometric shape defined by two end edges 47 and two side edges 44. End edges 47, in the assembled state, as seen in the longitudinal direction L, form first end 32 and second end 34 of lining element 30. The two side edges 44 of each lining part are subdivided into a first side edge section 45 and a second side edge section 46, said first side edge section 45 being associated with main pipe section 42 and said second side edge section 46 being associated with branch pipe section 43. With lining part 40, side edge sections 46 and side edge sections 45 each essentially have a rectilinear configuration, and converge to a point of intersection S while defining a predetermined angle α. With lining part 41, side edge sections 46 and side edge sections 45 each essentially have a rectilinear configuration and extend on a common axis.

The four flat, planar lining parts 40, 41 are connected to each other by means of four connections 48 to form lining element 30. Per the illustrated embodiment, each connection 48 is created by sewing and/or gluing. However, other alternatives for joining lining parts 40, 41, are also possible.

To achieve this, in a first step, a first lining part 40 and a second lining part 41 are positioned side by side in such a manner that the two adjacent side edges 44 of the two lining parts 40, 41 are in part essentially in contact with each other. Then these adjacent side edges 44 are sewn and/or glued together to form a first connection 48. This sewing can be carried out on a planar support surface, which is much more advantageous than a radial seam. Next, a third lining part 40 can be positioned next to the free side edge 44 of one of the two already connected lining parts 40, 41 in such a manner that one side edge 44 of third lining part 40 is adjacent to a free side edge 44 of the two already connected lining parts 40 or is positioned in a neighboring fashion. Subsequently, these facing side edges 44 are sewn and/or glued together to form a second connection 48. Following this, a fourth lining part 41 is attached to the third lining part 40 by means of a seam as a third connection 48 in the manner already described.

The four lining parts 40, 41 have now been connected to each other using three connections 48. As a next step, these four connected lining parts 40, 41 are positioned in such a way, for example by slightly bending or folding them, such that the two remaining free side edges 44 come to lie in a side-by-side or adjacent relationship. Subsequently, these two side edges 44 are sewn and/or glued together to form a fourth connection 48. Finally, the lining element 30 thus formed can be pressed to create the hat shape according to FIG. 4.

Subsequently, if needed, a reinforcing element 85 can be attached to lining element 30 in the area of its second end 34 (not shown), for example, by means of an adhesive connection. In this context, reference is made to the above explanations with respect to first lining element 10.

By connecting by means of connections 48, forming the lining parts 40, 41 connected to each other and/or attaching reinforcing element 85, a fold or kink, or a bent area (cf. broken line 49 in FIG. 4) is formed in the transition area from main pipe section 42 to branch pipe section 43. This fold or kink 49 can have a curvilinear or annular configuration or be essentially rectilinear. The four main pipe sections 42 can thus together form a rim or a ring. Furthermore, together the four branch pipe sections 43 can form a sleeve. Main pipe sections 42, in the installed state, i.e. after the repair action, are in snug contact with the main pipe, and branch pipe sections 43, in the installed state, are in snug contact with the branch pipe, such as a house connection line.

According to the illustrated embodiment, the four connections 48 are continuously configured, i.e. starting from one of the two end edges 47 to the other end edge 47. The number of connections 48 thus corresponds to the number of lining parts 40, 41. Each of connections 48 extend along adjacent or facing side edges 44 of lining parts 40, 41. In the case of configuring connection 48 as a seam, this connection 48 can also be referred to as a longitudinal seam.

As an alternative, it can basically also be provided that some of the adjacent side edges 44 overlap, and lining parts 40, 41 form a connection 48 in the overlapping area.

Furthermore, if connection 48 is configured as a seam and additional sealing is desired, an adhesive tape or masking tape can be applied to the seam and/or along side edges 44.

Figure 7:
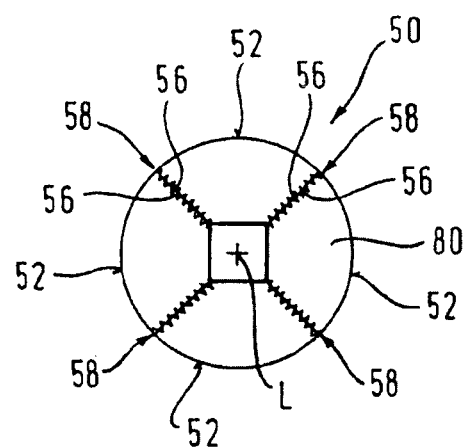
FIG. 7 is a bottom view of a third lining element of four lining parts.
Figure 8:
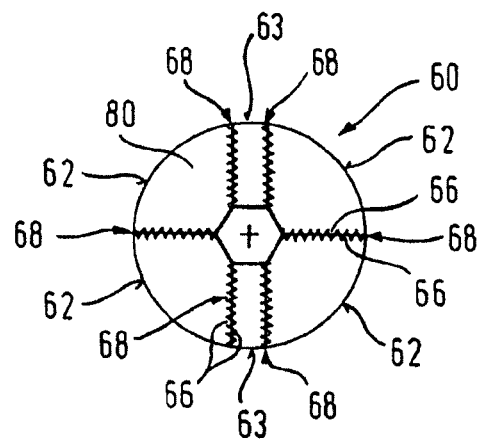
FIG. 8 is a bottom view of a fourth lining element of six lining parts.
Figure 9:
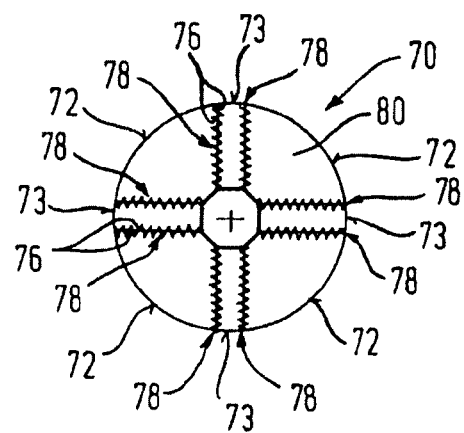
FIG. 9 is a bottom view of a fifth lining element of eight lining parts.

FIGS. 7, 8 and 9 show further embodiments of lining elements according to the present invention, which are based on first lining element 10 according to FIGS. 1 to 3, and on second lining element 30 according to FIGS. 4 to 6 and include additional lining parts. Herein, FIGS. 7, 8 and 9, and similarly FIGS. 2 and 5, are views of the respective lining element from below and along longitudinal direction L.

Lining element 50 according to FIG. 7 is thus composed of four essentially similarly shaped lining parts 52, connected to each other by means of four connections 58. To achieve this, neighboring, adjacent side edges 56 of the, in total, four lining parts 52 are sewn and/or glued together according to the procedure mentioned above.

Lining element 60 according to FIG. 8 is composed of four essentially similarly shaped lining parts 62 and two essentially similarly shaped, roughly rectangular lining parts 63, connected to each other by means of six connections 68. For this purpose, the neighboring, adjacent side edges 66 of the, in total, six lining parts 62, 63 are sewn and/or glued together according to the procedure mentioned above.

Lining element 70 according to FIG. 9 is composed of four essentially similarly shaped lining parts 72 and four essentially similarly shaped, roughly rectangular lining parts 73, connected to each other by means of eight connections 78. For this purpose, the neighboring, adjacent side edges 76 of the, in total, eight lining parts 72, 73 are sewn and/or glued together according to the procedure mentioned above.

In all lining elements 50, 60 and 70 shown in FIGS. 7, 8 and 9, connections 58, 68 and 78 extend in a manner corresponding to connections 28, 48 parallel to longitudinal direction L, and thus normal to the drawing plane, and continue to the other ends of side edges 56, 66 and 76 (not shown).

As to the method of manufacturing lining elements 50, 60 and 70, reference can be made to the above explanations with respect to lining elements 10 and 30.

Figure 10:
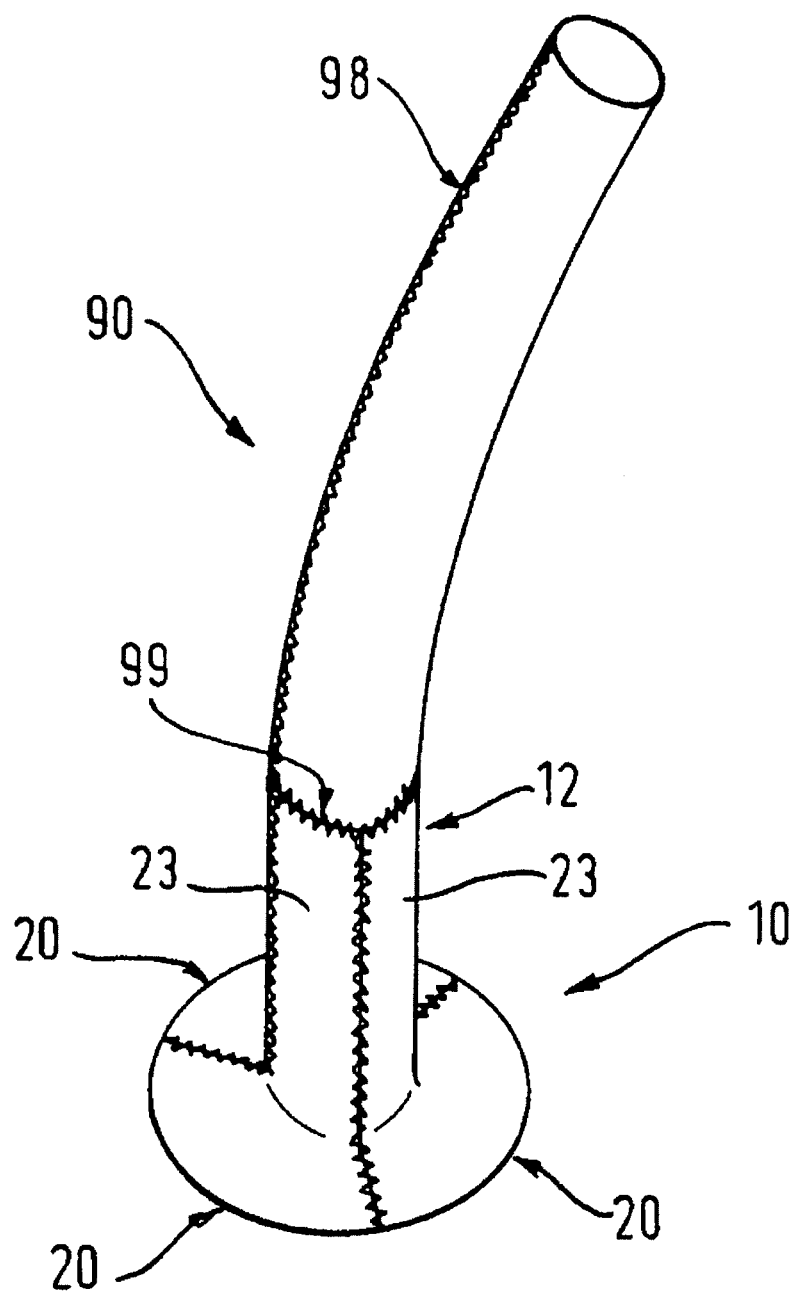
FIG. 10 is a perspective view of the first lining element of FIG. 1, connected to a branch pipe extension.

FIG. 10 is a perspective view of first lining element 10 according to FIG. 1 connected to a branch pipe extension 90. With respect to the configuration and manufacture of first lining element 10, reference can be made to the above explanations. Branch pipe extension 90, in the installed position, is in snug contact with the branch pipe and can have a length of, for example, up to about 20 m or more.

Branch pipe extension 90 comprises on principle at least one lining part 92. In the embodiment shown in FIG. 10, a single lining part 92 is provided. According to the illustrated embodiment, lining part 92 is made from a flat sheet material, i.e. a planar initial configuration, by rolling it and establishing a connection along longitudinal edges 96. According to FIG. 10, branch pipe extension 90 is connected to first end 12 formed by branch pipe sections 23 of lining parts 20 by means of at least one connection 99, such as by means of sewing and/or gluing, said connection essentially extending radially in the circumferential direction with respect to branch pipe extension 90. Branch pipe extension 90 can thus be connected to lining element 10 by means of a radial seam.

All lining elements 10, 30, 50, 60, 70 comprise at least one layer of resin-absorbing material 80, and optionally additionally at least one coating. This resin-absorbing layer 80 comprises, per the illustrated embodiment, a fibrous material, a non-woven material and/or a knitted spacer material. For example, layer 80 can thus comprise, in particular, glass fibers, polyester fibers, polypropylene fibers, carbon fibers and/or aramid fibers. Of these components only individual ones or any combinations can be used. Furthermore, lining element 10, 30, 50, 60, 70 or its respective lining parts can comprise a plastic film as a fluid impermeable layer, such as a film of PVC or thermoplastic polyurethane. Such a coating can be applied to the layer of resin-absorbing material 80 by laminating or by means of a calendar.

In particular, in the situations shown in FIGS. 1, 2, 4, 5, 7 to 9, in the not-yet installed state, the coating is on the outside, and the resin-absorbing layer 80 is on the inside. In the finished, installed state, the coating will be on the inside, that is facing the longitudinal axis of the pipe, and the resin-absorbing layer 80 will be on the outside, that is facing the inner surface of the pipe.

Figure 11:
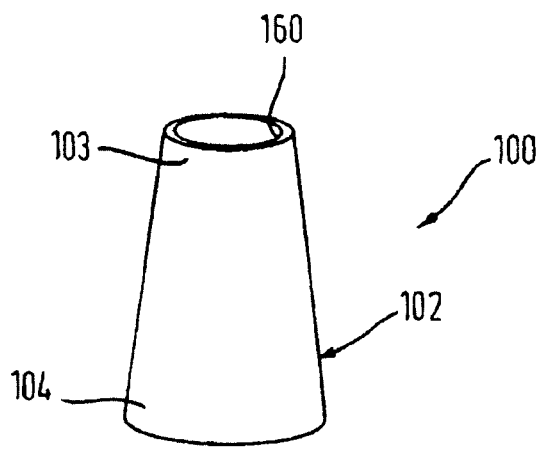
FIG. 11 is a perspective view of a sixth lining element in its preform and of a forming body.
Figure 11:
Figure 11:
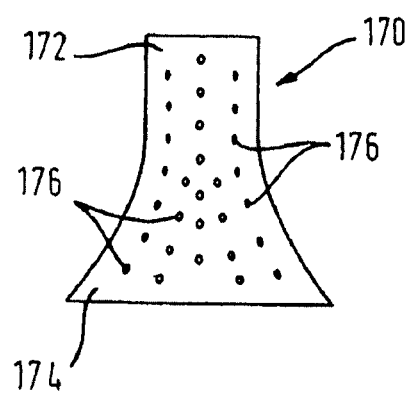

Further embodiments of lining elements 100, 120, 130, 140, 150 according to a further aspect of the invention will be described in the following with reference to FIGS. 11 to 21:

FIG. 11 is a perspective view of a sixth lining element 100 and a forming body 170.

Lining element 100 comprises a single lining part 102, which essentially has the form of a hat and is used for repair purposes to seal cracks in the area of a joint between a main pipe and a branch pipe. Lining part 102 comprises a sleeve area 103 and a rim area 104. Sleeve area 103, in the installation position, will come to lie on the inside of the branch pipe. Rim area 104, in the installation position, comes to lie on the inside of the main pipe. Lining element 100 comprises a layer of resin-absorbing material 160 and a coating (not shown).

In the situation shown in FIG. 11, preceding installation, the coating is on the outside and the resin-absorbing layer is on the inside. In the finished, installed state of lining element 100 in the pipe joint, the coating is on the inside, which means facing the longitudinal axis of the pipe, and the resin-absorbing layer 160 is on the outside, which means facing the inner side wall of the pipe.

The one-piece lining part 102 is shown in its tubular pre-shaped preform in FIG. 11. Lining element 100 can also be referred to as a semi-finished product. First lining part 102 has a shape resembling a hat, where the outer contour of lining part 102 extends from a sleeve area 103 into rim area 104 in an arcuate fluid transition. Sleeve area 103 and rim area 104 thus consist of a single material piece, namely lining part 102. This lining part 102 can be provided with or without a coating.

Figure 12:
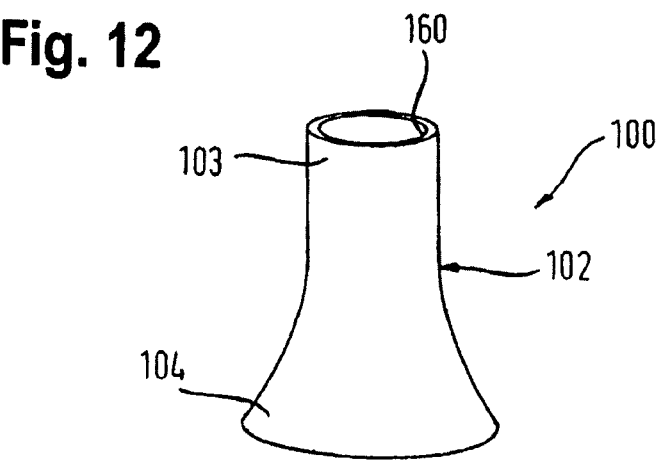
FIG. 12 is a perspective view of the sixth lining element in its final shape.

Forming body 170 also shown in FIG. 11 comprises a first end 172, a second end 174 and a plurality of openings 176. To confer the tubular final shape to lining part 102 shown in its tubular preform in FIG. 11, lining part 102 is slipped over conical forming body 170 in the direction of the arrow over first end 172 in the direction of end 174. During this slip-on process, layer 160, and therefore lining part 102, is expanded. Lining part 102 is thus deformed and assumes its final shape. Openings 176 in forming body 170 enable lining part 102 to have heat applied to it by means of hot steam, enabling simplified expansion or stretching. After deformation, a cooling process follows, wherein lining part 102 remains on forming body 170, in order to consolidate the established final shape of the lining part or in other words, to stabilize its form. Furthermore, it can be provided that the coating is applied prior to or after the forming method. This coating can also contribute to a consolidation of the final shape. Furthermore, the coating, such as a film, can be configured in such a manner that in the installed state, it prevents washing out of the resin from the area to be repaired. FIG. 12 shows the tubular, preformed lining part 102 in its final shape after deformation by means of forming body 170. The amount of deformation in rim area 104 is greater than in sleeve area 103, since usually branch pipe 210 is oriented at a right angle to main pipe 200 in the arcuate transition area between the two areas (see FIG. 13).

Figure 13:
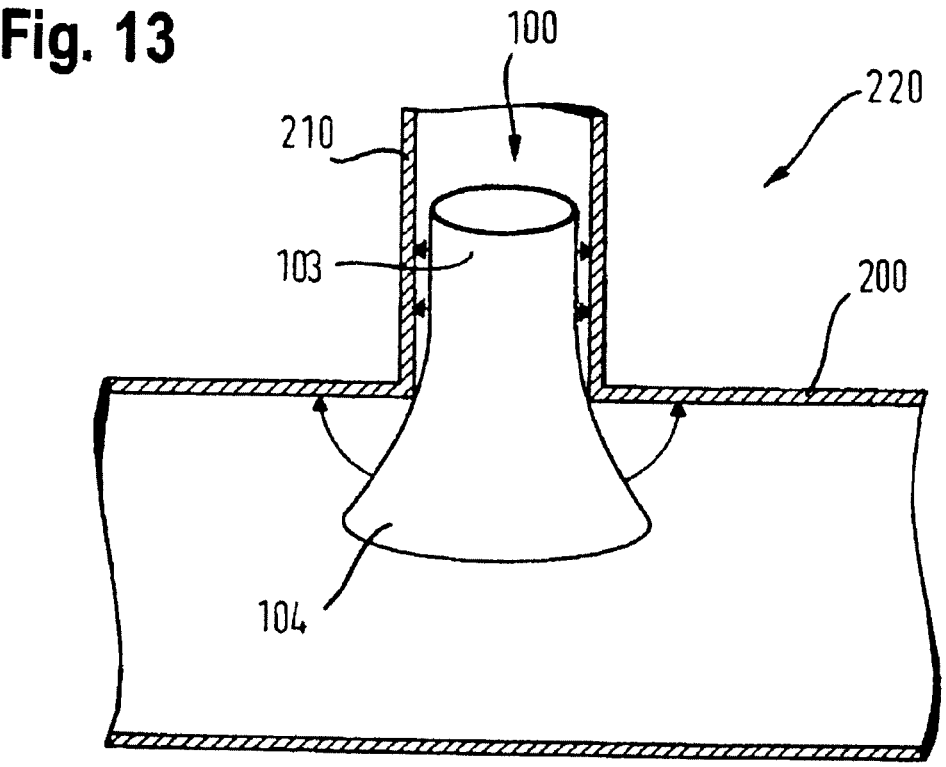
FIG. 13 is a schematic cross section of a pipe branch wherein the sixth lining element is indicated.

FIG. 13 shows a schematic cross section through joint 220 while indicating first lining element 100 in a position not yet finally fixed at joint 220. In the area of joint 220, a branch pipe 210 meets a main pipe 200. Herein, lining element 100 is in its final shape established by means of the previously described method, wherein the layer of resin-absorbing material 160 has already been impregnated with a resin.

To install lining element 100 for the repair of joint 220 at main pipe 200 and branch pipe 210, a conventional repair method, in particular an inversion method is used. Herein, first, rim area 104 is made to lie on the inner side wall of main pipe 200 and pressed into contact there. Subsequently, sleeve area 103 is inverted through the lower opening in rim area 104 so that layer 160 impregnated with resin comes to lie on the inner side wall of branch pipe 210. Then a calibrating hose, for example, is applied to lining element 100, so that sleeve area 103, in particular, can be pressed against the inner side wall of branch pipe 210. By applying pressure by means of a fluid medium in the calibration hose, sleeve area 103 and rim area 104 are pressed against branch pipe 210 and main pipe 200, where the resin acting as an adhesive glue has an attaching and sealing effect. After hardening of the resin, the repair is complete and joint 220 is sealed. The arrows shown in FIG. 13 indicate the directions in which areas 103, 104 come to lie on pipes 200, 210, where they are fixedly attached to the pipe sections after hardening.

Figure 14:
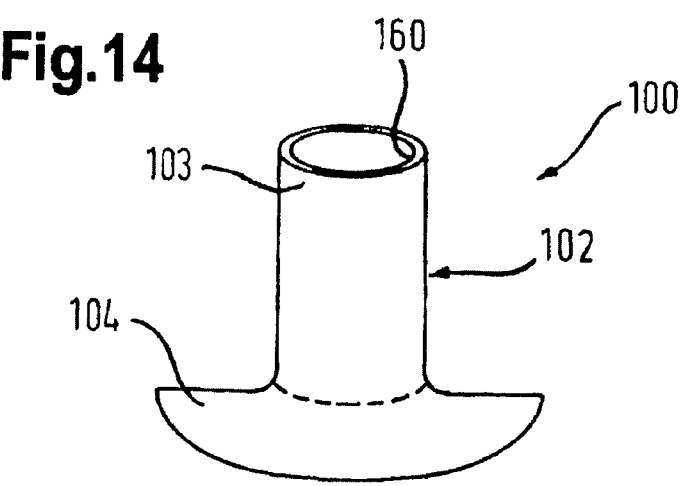
FIG. 14 is a perspective view of the sixth lining element in a different final shape.

FIG. 14 is a perspective view of sixth lining element 100, which is based on the same preform as in FIG. 11, but has a different final shape. To achieve this, for example, after expanding lining part 102 and applying hot steam to it, a further forming step can be carried out. A further forming body (not shown) can be slipped, for example, over lining part 102 in such a manner, that lining part 102 is subjected to bending or folding in the transition area between sleeve area 103 and rim area 104. Such a fold is indicated by the broken line in FIG. 14. This different final shape of lining element 100 provides an even better fit on the corresponding geometric shape of joint 220 to be repaired.

Figure 15:
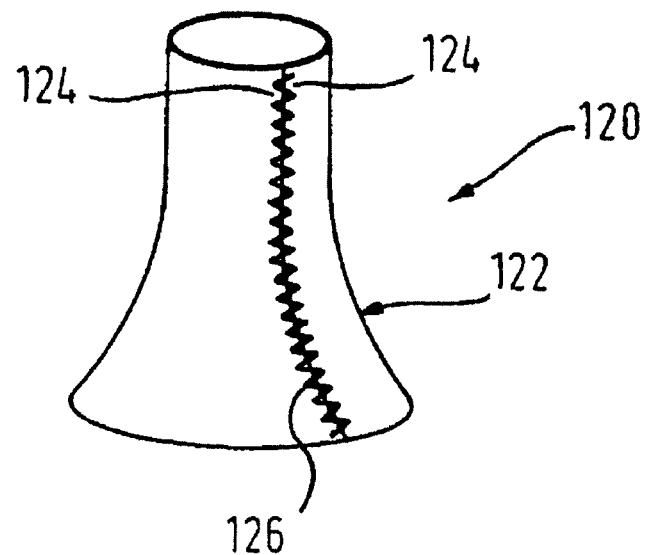
FIG. 15 is a perspective view of a seventh lining element.

FIG. 15 is a perspective view of a seventh lining element 120. Lining element 120 consists of a single lining part 122 and thus has an integral or one-piece configuration. This single lining part 122 has been cut from a flat, planar layered material 160. Subsequently, the tubular preform is made from this planar, flat material by means of rolling. In the area of the two longitudinal edge areas, a side edge 124 is present on each side. After rolling into the preform the two side edges 124 are connected by means of a connection 126. This connection 126 is, in the illustrated embodiment, a seam. Subsequently, the tubular, preformed lining part 122 can be brought into the desired final shape by means of forming body 170, as already described above. To seal the seam, i.e. connection 126, an adhesive tape or masking tape can be applied to the seam and along side edges 124.

Figure 16:
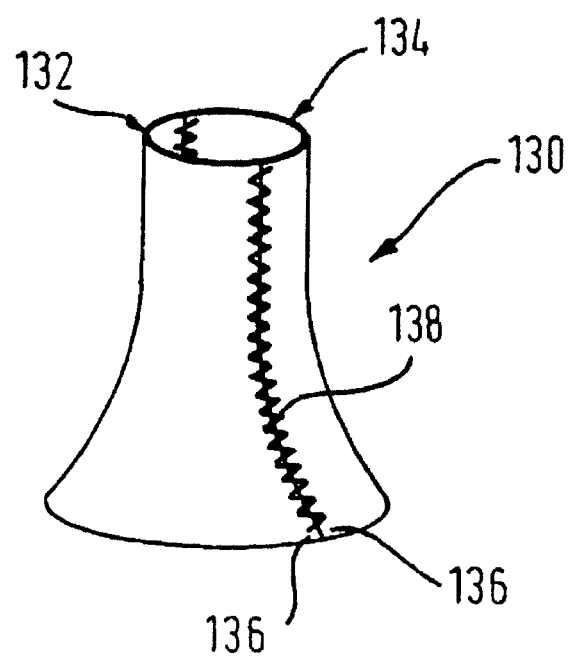
FIG. 16 is a perspective view of a eighth lining element.
Figure 17:
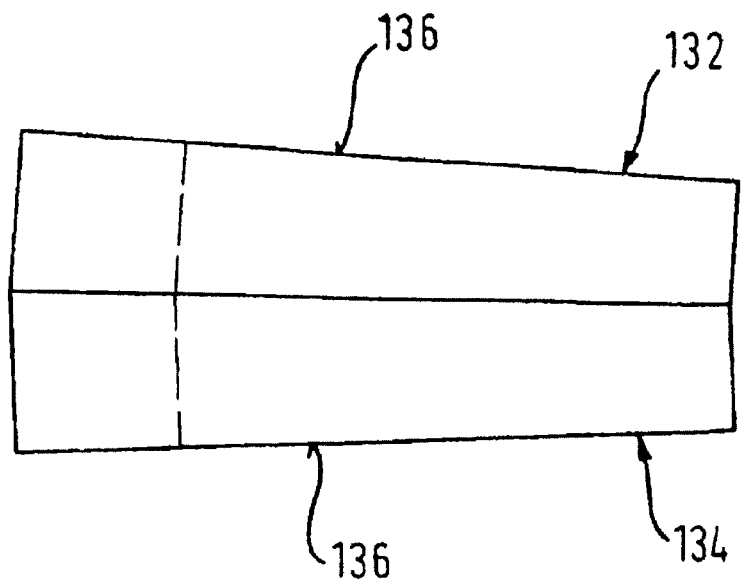
FIG. 17 is a plan view of the planar initial form of the lining part according to FIG. 16.
Figure 18:
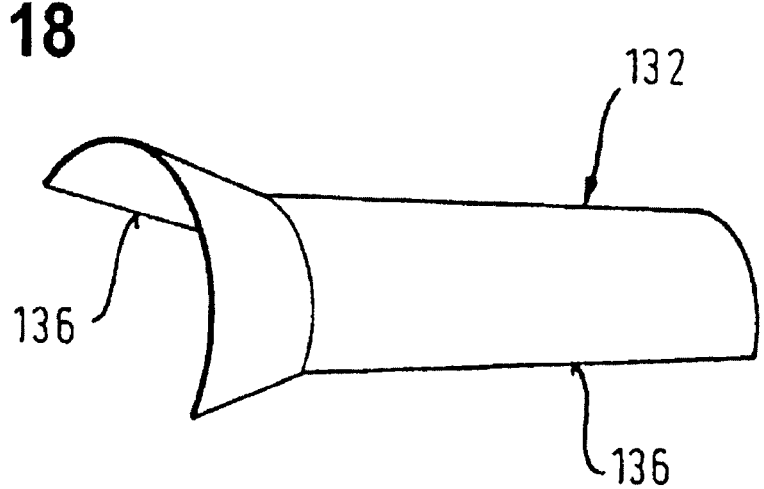
FIG. 18 is a perspective view of a lining part for the eighth lining element.

FIG. 16 is a perspective view of an eighth lining element 130. In contrast to the embodiment according to FIG. 15, this lining element 130 comprises two lining parts 132 and 134. FIGS. 17 and 18 show the initial elements for the two lining parts 132, 134 of lining element 130. Herein, FIG. 17 shows the geometrically cut form for the flat, planar initial element of layer 160. FIG. 18 shows the half-shell shape produced from the flat initial shape by means of bending or the like, for each of lining parts 132, 134. These lining parts 132, 134 can thus be produced from a flat, planar material, just like the lining part 122 according to FIG. 15. Subsequently, the edge sections along the longitudinal sides of lining parts 132, 134 are connected along their side edges 136. Again, a seam is preferably used as a connection 138, wherein each of adjacent side edges 136 are directly or indirectly connected. After this connection of the two lining parts 132, 134, as explained with reference to FIG. 15, a tubular preform can be produced by means of forming body 170, followed by the production of the tubular final shape.

Figure 19:
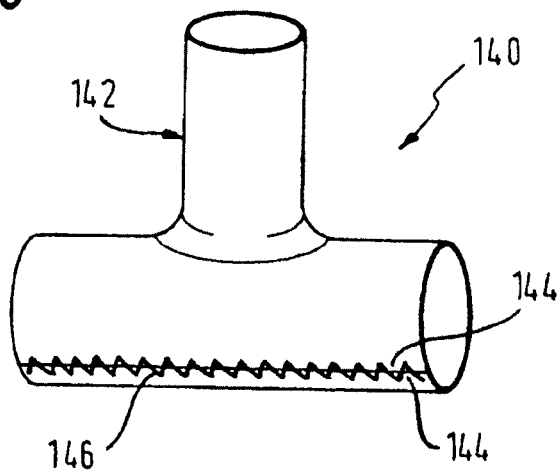
FIG. 19 is a perspective view of a ninth lining element.

FIG. 19 is a perspective view of a ninth lining element 140. This lining element 140 has an essentially T-shaped configuration and comprises a larger lining area provided for main pipe 200 compared to rim area 104 of the above-described lining elements. This lining element 140 comprises a single lining part 142. In a similar manner to that explained in FIG. 15, a connection 146 is provided in the area of side edges 144, such as, for instance, in the form of a seam.

Figure 20:
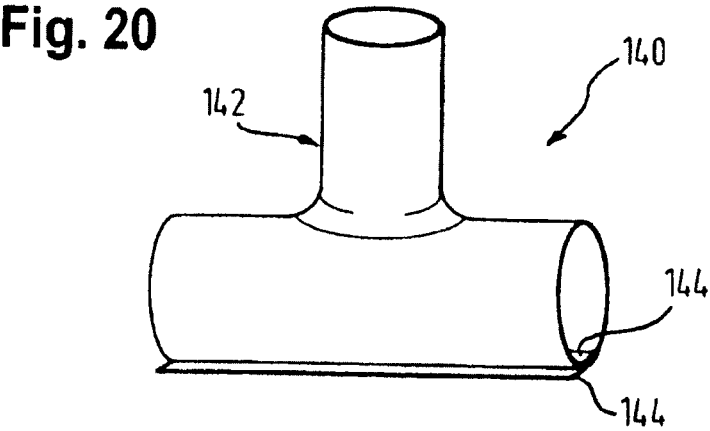
FIG. 20 is a further perspective view of the ninth lining element.

FIG. 20 shows lining element 140 again, wherein, in contrast to FIG. 19, side edges 144 are in an overlapping arrangement. This enables a tighter connection of side edges 144. The connection (not shown) of the two side edges 144 is also by means of a seam.

Figure 21:
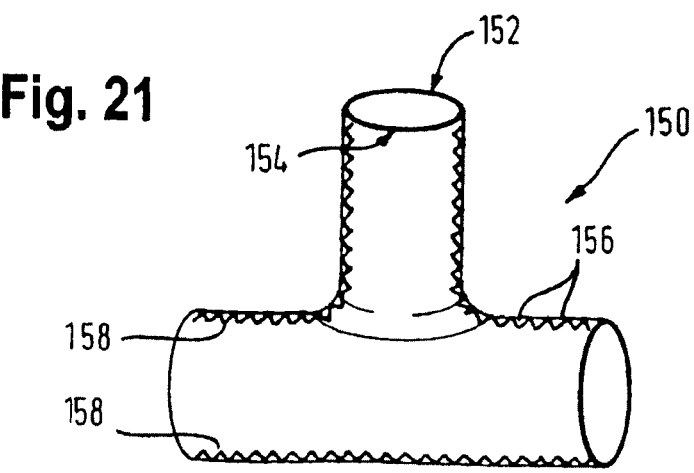
FIG. 21 is a perspective view of a tenth lining element.

FIG. 21 shows a tenth lining element 150 having two lining parts 152 and 154, similarly to lining element 130 in FIG. 16. The two lining parts 152 and 154 are connected to each other in the area of their side edges 156, each by means of a connection 158, for instance a seam.

Figure 22:
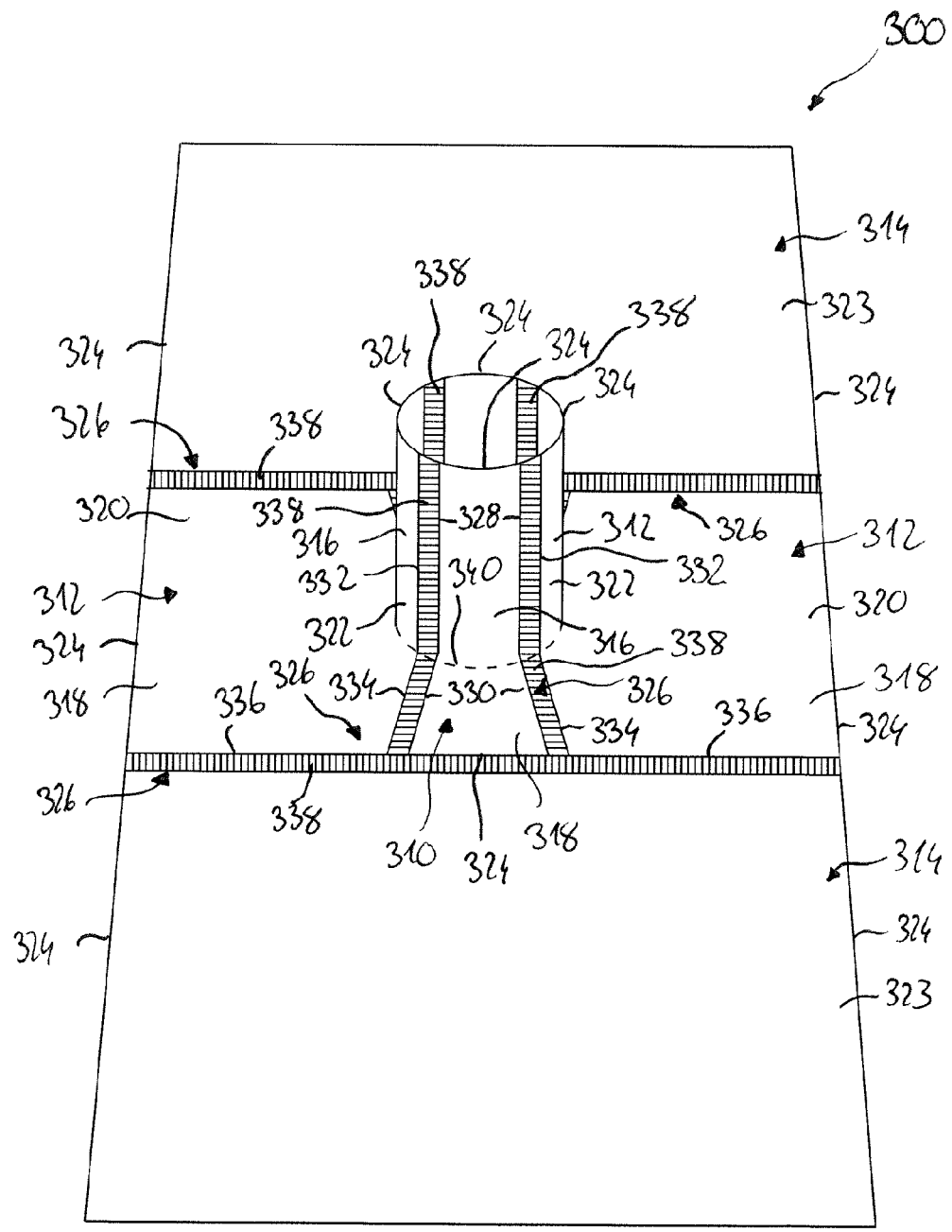
FIG. 22 is a perspective view of an eleventh lining element.
Figure 23:
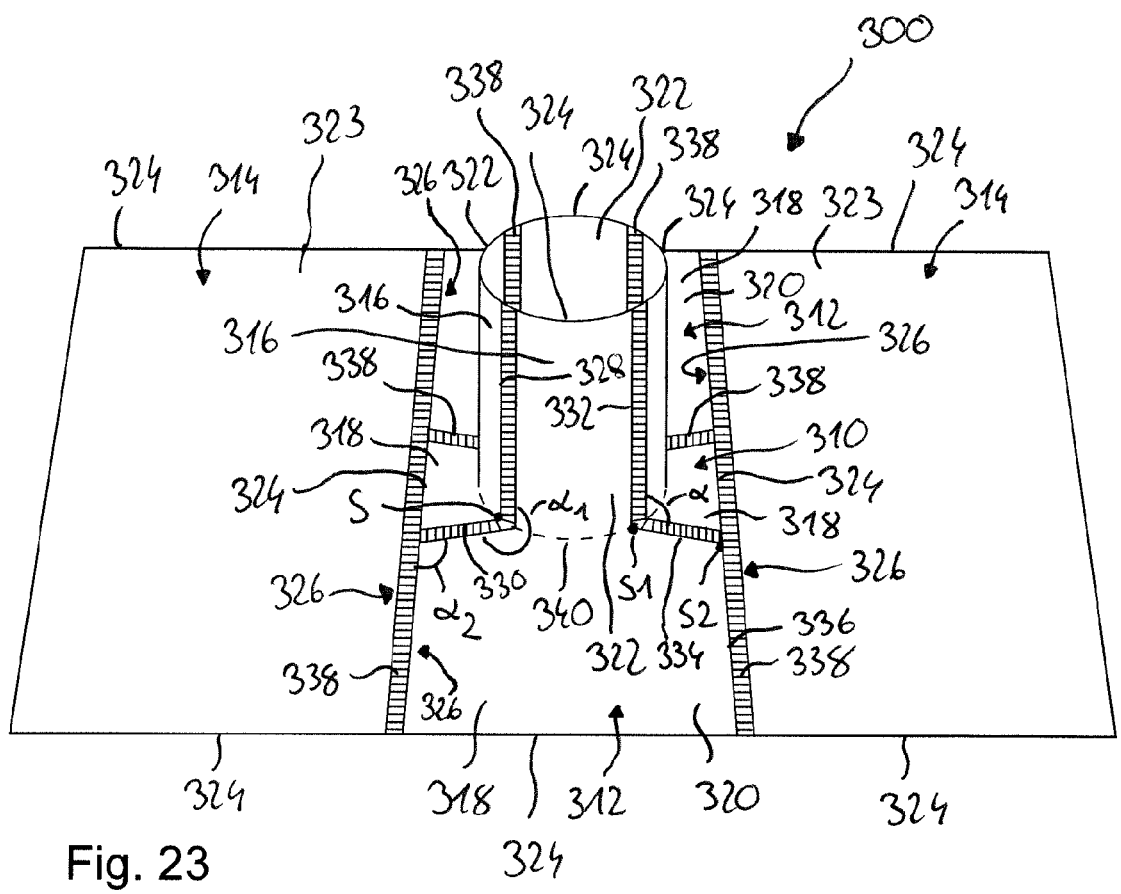
FIG. 23 is a further perspective view of the eleventh lining element.
Figure 24:
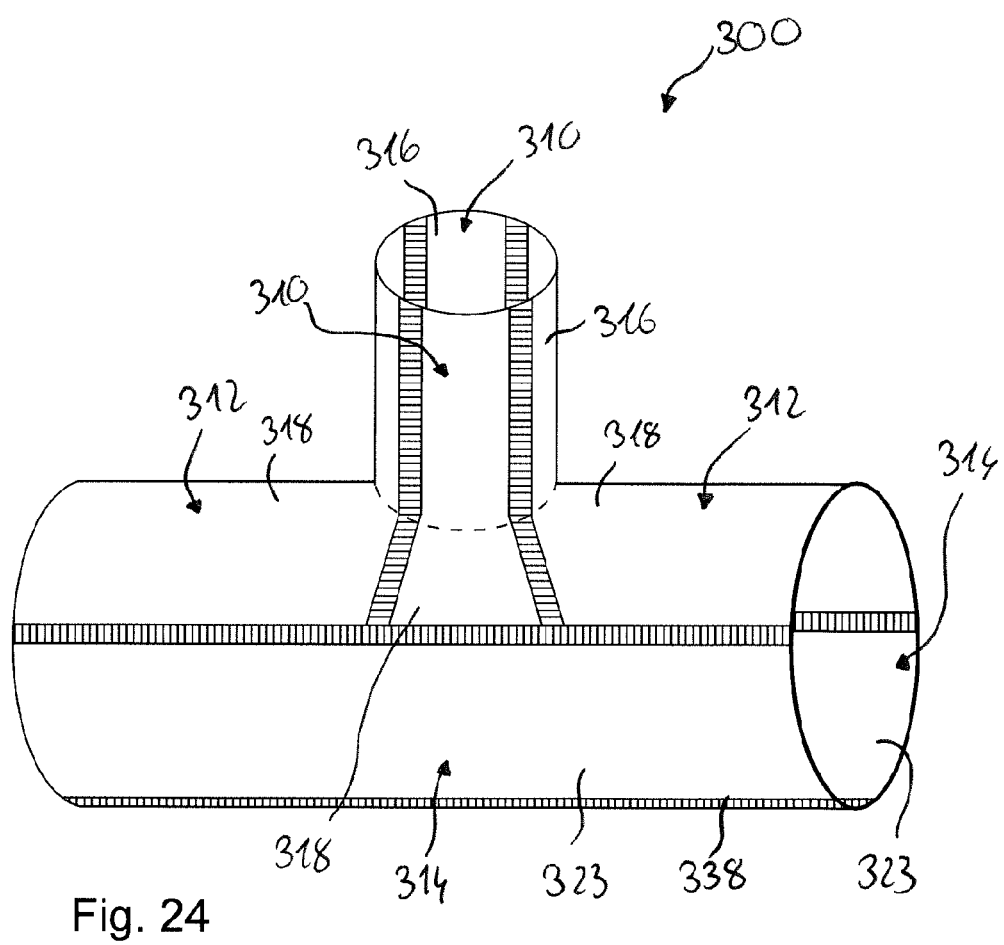
FIG. 24 is a further perspective view of the eleventh lining element wherein the main pipe sections are connected to each other forming a main pipe area.

FIGS. 22 to 24 show an eleventh lining element 300 for repairing a joint area between a main pipe and a branch pipe. Eleventh lining element 300 comprises three different types of lining parts, namely lining part 310, lining part 312 and lining part 314 as initial elements for the manufacture of the lining element 300. FIG. 22 is a first perspective view of the eleventh lining element 300, FIG. 23 is a second perspective view of the eleventh lining element 300 and FIG. 24 is a perspective view of the eleventh lining element 300 in its installed state. Lining element 300 consists of two lining parts 310, two lining parts 312 and two lining parts 314 and thus of a total of six lining parts. The six lining parts 310, 312, 314 have a planar, flat configuration, as initial elements for the lining element 300.

Lining parts 310, 312 comprise a branch pipe section 316 and a rim pipe section 318, which are, per the illustrated embodiment, integrally connected. In the installed position, the branch pipe section 316 is in snug contact with the branch pipe and the rim pipe section 318 is in snug contact with the main pipe, in particular with a rim portion of the main pipe. The lining parts 310 have a nearly rectangular configuration. The lining parts 312 comprise a first rectangular section 320 with a nearly rectangular configuration and a second rectangular section 322 with a nearly rectangular configuration, wherein said first rectangular section 320 being associated with the rim pipe section 318 and said second rectangular section 322 being associated with the branch pipe section 316. The first rectangular section 320 is larger than the second rectangular section 322. In the installed position, the first rectangular section 320 is in snug contact with the main pipe, in particular with the rim portion of the main pipe, and second rectangular section 322 is in snug contact with the branch pipe. The lining parts 314 comprise a main pipe section 323 with a nearly rectangular configuration which, in the installed position, is only in snug contact with the branch pipe.

To manufacture eleventh lining element 300, two of the initially flat, planar lining parts 310, two of the initially flat, planar lining parts 312 and two of the initially flat, planar lining parts 314 are cut to size and prepared. The two lining parts 310, the two lining parts 312 and the two lining parts 314 each essentially have the same geometric shape. The geometric shape of the lining parts 310 is defined by two end edges 324 and two side edges 326. The two side edges 326 of the lining part 310 are subdivided into a first side edge section 328 and a second side edge section 330. The first side edge section 328 of the lining parts 310 being associated with branch pipe section 316 and the second side edge section 330 being associated with the rim pipe section 318. With lining part 310, side edge sections 328 and side edge sections 330 each essentially have a rectilinear configuration, and a converge to a point of intersection S while defining a predetermined angle α. The geometric shape of the lining parts 312 is defined by two end edges 324 and two side edges 326. The two side edges 326 of the lining part 312 are subdivided into a first side edge section 332, a second side edge section 334 and a third side edge section 336. The first side edge section 332 of the lining parts 312 are associated with branch pipe section 316 and the second and third side edge sections 334, 336 are associated with rim pipe section 318. With lining part 312, first side edge sections 332, second side edge sections 334 and third side edge sections 336 each essentially have a rectilinear configuration, wherein first side edge sections 332 and second side edge sections 334 have a converge to a first point of intersection S1 while defining a predetermined first angle α1 and wherein second side edge sections 334 and third side edge sections 336 have a converge to a second point of intersection S2 while defining a predetermined second angle α2. The geometric shape of the lining element 314 is defined by two end edges 324 and two side edges 326 wherein the side edges 326 of the lining part 314 have essentially a rectilinear shape.

The six planar, flat lining parts 310, 312, 314 are connected to each other by means of seven connections 338 to form the lining element 300 shown in FIG. 24. In the illustrated embodiment, each connection 338 is achieved by means of sewing and/or gluing. However, other alternatives for joining lining parts 310, 312, 314 are also possible.

To achieve this, in a first step, a first lining part 310 and a second lining part 312 can be positioned side by side in such manner that the adjacent side edge 326 of the lining part 310 and the side edge sections 332, 334 of the lining part 312 are in part essentially in contact with each other. Then, the adjacent side edge 326 and the side edge sections 324, 326 are sewn and/or glued together to form a connection 338. This sewing can be carried out on a planar support surface, which is much more advantageous than a radial seam. Next, a third lining part 310 can be positioned next to the free side edge sections 332, 334 of the second lining part 312 in such a manner that one side edge 326 of the third lining part 310 is adjacent to free side edge sections 332, 334 of the second lining part 312 or is positioned in a neighboring fashion. Subsequently, these facing side edge 326 and side edge sections 332, 334 are sewn and/or glued together to form a second connection 338. Following this, a fourth lining part 312 is attached to the third lining part 310 by means of a seam as a third connection 338 in the manner already described.

The four lining parts 310, 312 have now been connected to each other using three connections 338. As a next step, these four lining parts 310, 312 are positioned in such a way, for example by slightly bending or folding them, such that the remaining free side edge 326 and the remaining free side edge sections 332, 334 come to lie in a side-by-side or adjacent relationship. Subsequently, the side edge 326 and the side edge sections 332, 334 are sewn and/or glued together to form a fourth connection 338.

The four lining parts 310, 312 have now been connected to each other using four connections 338. As a next step, a fifth lining part 314 having only a main pipe section 323 can be positioned next to the free end edge 324 of the lining part 310 and the free side edge sections 336 of the lining parts 312 in such a manner that one side edge 326 of the lining part 314 is adjacent to free side edge sections 336 of the lining parts 312 and free end edge 324 of the lining part 310 or is positioned in a neighboring fashion. Subsequently, these facing side edge 326, side edge sections 336 and end edge 324 are sewn and/or glued together to form a fifth connection 338.

As a next step, a six lining part 314 having only a main pipe section 323 can be positioned next to the free end edge 324 of the lining part 310 and the free side edge sections 336 of the lining parts 312 in such a manner that one side edge 326 of the lining part 314 is adjacent to free side edge sections 336 of the lining parts 312 and free end edge 324 of the lining part 310 or is positioned in a neighboring fashion. Subsequently, these facing side edge 326, side edge sections 336 and end edge 324 are sewn and/or glued together to form a six connection 338.

Finally, the free side edges 326 of the lining parts 314 can be positioned side by side in such a manner that the side edges 326 of the lining parts 314 are in part essentially in contact with each other (comparable to that shown in FIG. 19) or the side edges 326 of the lining parts 314 are in an overlapping arrangement (comparable to that shown in FIG. 20) forming a sleeve which in the installed state is in snug contact with the main pipe. Subsequently, theses facing side edges 326 are sewn and/or glued together to form a seven connection 338 as shown in FIG. 24.

By connecting by means of connections 338, forming the lining parts 310, 312 connected to each other a fold or kink, or a bent area (cf. broken lines 340 in FIGS. 22 to 24) is formed in the transition area from branch pipe section 316 to rim pipe section 318. This fold or kink 340 can have a curvilinear or annular configuration or be essentially rectilinear. Furthermore, together the four branch pipe sections 316 can form a sleeve and together the rim pipe sections and the two main pipe sections 320 can form a sleeve.

Per the exemplary embodiment, the seventh connections 338 are continuously configured, i.e. starting from one of the two end edges 324 to the other end edge 324 or starting from one side edge section 334 to the end edge 324. In the case of configuring connection 338 as a seam, this connection 338 can also be referred to as a longitudinal seam.

As an alternative, it can basically also be provided that some of the adjacent side edges 326, side edge sections 328, 330, 332, 334, 336 and/or end edge 324 overlap, and lining parts 310, 312, 314 form a connection 338 in the overlapping area. Furthermore, if connection 338 is configured as a seam and additional sealing is desired, an adhesive tape or masking tape can be applied to the seam, along side edges 326, side edge sections 328, 330, 332, 334, 336 and/or end edge 324.

Figure 25:
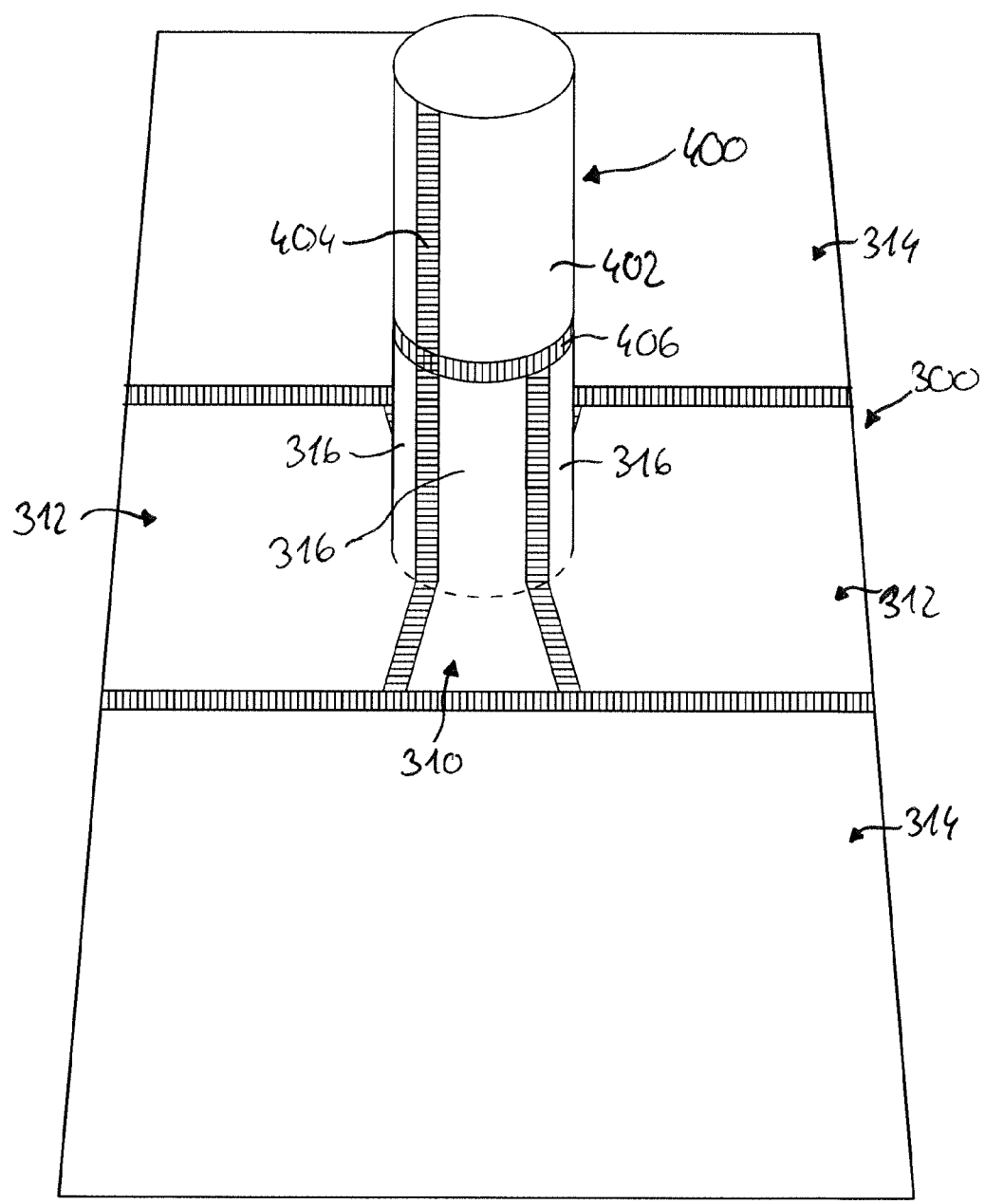
FIG. 25 is a perspective view of the eleventh lining element of FIG. 22, connected to a branch pipe extension.

FIG. 25 is a perspective view of an eleventh lining element 300 according to FIGS. 22 to 24 connected to a branch pipe extension 400. With respect to the configuration and manufacture of eleventh lining element 300, reference can be made to the above explanations. Branch pipe extension 400, in the installed position, is in snug contact with the branch pipe and can have a length of, for example, up to about 20 m or more.

Branch pipe extension 400 comprises in principle at least one lining part 402. In the embodiment shown in FIG. 24, a single lining part 402 is provided. According to the exemplary embodiment, lining part 402 is made from a flat sheet material, i.e. a planar initial configuration, by rolling it and establishing a connection along longitudinal edges 404. According to FIG. 25, branch pipe extension 400 is connected to a first end formed by branch pipe sections 316 of lining parts 310, 312 by means of at least one connection 406, such as by means of sewing and/or gluing, said connection extending radially in the circumferential direction with respect to branch pipe extension 400. Branch pipe extension 400 can thus be connected to lining element 300 by means of a radial seam.

All lining elements 100, 120, 130, 140, 150, 300 comprise at least one layer of resin-absorbing material 160 and optionally additionally at least one coating. With respect to this resin-absorbing layer 160 and the coating, if any, the explanations given above with reference to lining elements 10, 30, 50, 60, 70 apply in an analogous fashion (cf. layer 80 and coating).

To position and finally fix in place each lining element 10, 30, 50, 60, 70, 100, 120, 130, 140, 150, 300 in its desired position at the joint position or at the connection area, a repair method is chosen in which lining element 10, 30, 50, 60, 70, 100, 120, 130, 140, 150, 300 is inverted. In this procedure, lining element 10, 30, 50, 60, 70, 100, 120, 130, 140, 150, 300 is turned inside out. To achieve this, lining element 10, 30, 50, 60, 70, 100, 120, 130, 140, 150, 300 is reversed. Prior to inserting lining element 10, 30, 50, 60, 70, 100, 120, 130, 140, 150, 300 into the pipe to be repaired, resin-absorbing layer 80, 160 is impregnated with a resin. This resin, after final positioning and pressing lining element 10, 30, 50, 60, 70, 100, 120, 130, 140, 150, 300 against the inner side wall of the pipe, results in a sealing attachment of lining element 10, 30, 50, 60, 70, 100, 120, 130, 140, 150, 300 to the pipe. The resin can be hardened by applying a fluid medium (for example by means of a gaseous or liquid medium), heat and/or light.

It is important to note that the present invention as shown and described in this specification is illustrative only. And although several embodiments of the present invention are described in detail herein, those skilled in the art will appreciate that many modifications are possible without materially departing from the novel teachings and advantages of the subject matter recited. Accordingly, all such modifications are intended to be included within the scope of the present innovations.

| List of reference numerals | |
|---|---|
| 10 | lining element |
| 12 | first end |
| 14 | second end |
| 20 | lining part |
| 22 | main pipe section |
| 23 | branch pipe section |
| 24 | side edge |
| 25 | side edge section |
| 26 | side edge section |
| 27 | end edge |
| 28 | connection |
| 29 | fold/kink |
| 73 | lining part |
| 30 | lining element |
| 32 | first end |
| 34 | second end |
| 40 | lining part |
| 41 | lining part |
| 42 | main pipe section |
| 43 | branch pipe section |
| 44 | side edge |
| 45 | side edge section |
| 46 | side edge section |
| 47 | end edge |
| 48 | connection |
| 49 | fold/kink |
| 50 | lining element |
| 52 | lining part |
| 56 | side edge |
| 58 | connection |
| 60 | lining element |
| 62 | lining part |
| 63 | lining part |
| 66 | side edge |
| 68 | connection |
| 70 | lining element |
| 72 | lining part |
| 76 | side edge |
| 78 | connection |
| 80 | resin-absorbing layer |
| 85 | reinforcing element |
| 90 | branch pipe extension |
| 92 | lining part |
| 96 | longitudinal edge |
| 98 | connection |
| 99 | connection |
| 100 | lining element |
| 102 | lining part |
| 103 | sleeve area |
| 104 | rim area |
| 120 | lining element |
| 122 | lining part |
| 124 | side edge |
| 126 | connection |
| 130 | lining element |
| 132 | lining part |
| 134 | lining part |
| 136 | side edge |
| 138 | connection |
| 140 | lining element |
| 142 | lining part |
| 144 | side edge |
| 146 | connection |
| 150 | lining element |
| 152 | lining part |
| 154 | lining part |
| 156 | side edge |
| 158 | connection |
| 160 | resin-absorbing layer |
| 170 | forming body |
| 172 | first end |
| 174 | second end |
| 176 | openings |
| 200 | main pipe |
| 210 | branch pipe |
| 220 | joint |
| 300 | lining element |
| 310 | lining part |
| 312 | lining part |
| 314 | lining part |
| 316 | branch pipe section |
| 318 | rim pipe section |
| 320 | rectangular section |
| 322 | rectangular section |
| 323 | main pipe section |
| 324 | end edge |
| 326 | side edge |
| 328 | side edge section |
| 330 | side edge section |
| 332 | side edge section |
| 334 | side edge section |

-continued

| List of reference numerals | |
|---|---|
| 336 | side edge section |
| 338 | connection |
| 340 | kink |
| 400 | branch pipe extension |
| 402 | lining part |
| 404 | longitudinal edge |
| 406 | connection |
| L | longitudinal direction |
| S | point of intersection |
| S1 | point of intersection |
| S2 | point of intersection |
| α | angle |
| α1 | angle |
| α2 | angle |

The invention in which an exclusive property or privilege is claimed is defined as follows:

1. A lining element for repairing a connection area between a main pipe and a branch pipe, the lining element comprising a layer of resin-absorbing material, wherein at least six flexible, expandable lining parts are connected to each other by at least seven connections to form the lining element.

2. The lining element according to claim 1, wherein the respective connection is formed by a seam and/or adhesive connection essentially extending along adjacent side edges, side edge sections and/or end edges of the lining parts.

3. The lining element according to claim 1, wherein the layer of resin-absorbing material comprises a fibrous material, a non-woven material and/or a knitted spacer material, wherein the material is selected from the group consisting of glass fibers, polyester fibers, polypropylene fibers, carbon fibers and/or aramid fibers.

4. The lining element according to claim 1, wherein the lining part includes a plastic film as a fluid-impermeable layer.

5. The lining element according to claim 1, wherein the at least one lining part has a first thickness in a first section and has a second thickness in a second section.

6. A lining element for repairing a connection area between a main pipe and a branch pipe, the lining element comprising a layer of resin-absorbing material, wherein at least six flexible, expandable lining parts are connected to each other by at least six connections to form the lining element, and wherein at least four of the lining parts comprise a branch pipe section and a rim pipe section and that the at least two other lining parts comprise a main pipe section.

7. The lining element according to claim 6, wherein the lining parts having a branch pipe section and a rim pipe section are connected to each other by connecting both the side edges of adjacent branch pipe sections and the side edges and/or side edge sections of adjacent rim pipe sections in a continuous fashion.

8. The lining element according to claim 6, wherein each of the lining parts having a main pipe section is connected with a side edge thereof to at least two side edges and/or side edge sections of adjacent rim pipe sections and to at least one side edge and/or end edge of an adjacent rim pipe section in a continuous fashion.

9. The lining element according to claim 6, wherein at least two of the lining parts having a branch pipe section and a rim pipe section comprise a nearly rectangular shape.

10. The lining element according to claim 6, wherein at least two of the lining parts having a branch pipe section and a rim section comprise a first rectangular section and a second rectangular section, wherein the first rectangular section is larger than the second rectangular section.

11. A lining element for repairing a connection area between a main pipe and a branch pipe, the lining element comprising a layer of resin-absorbing material, wherein at least six flexible, expandable lining parts are connected to each other by at least six connections to form the lining element, wherein, by means of at least one connection, the branch pipe sections are connected to a branch pipe extension, comprising at least one flexible, expandable lining part, and wherein the branch pipe extension is formed of a flat sheet material by rolling the flat sheet of material and establishing a connection along the longitudinal edges of the at least one lining part and by means of at least one seam and/or adhesive connection with the branch pipe sections, wherein said seam and/or adhesive connection extends essentially radially in the circumferential direction with respect to the branch pipe extension.

12. A lining element for repairing a connection area between a main pipe and a branch pipe, the lining element comprising a layer of resin-absorbing material, wherein at least six flexible, expandable lining parts are connected to each other by at least six connections to form the lining element, wherein the lining element further comprises at least one reinforcing element.

13. A method of manufacturing a lining element for repairing a connection area between a main pipe and a branch pipe, comprising the steps of: providing at least six flexible, expandable lining parts having a layer of resin-absorbing material wherein at least four lining parts comprise a branch pipe section and a rim pipe section and the at least two other lining elements comprise a main pipe section; and connecting the lining parts to form the lining element, wherein the at least six lining parts are connected to each other by at least seven connections to form the lining element.

14. The method according to claim 13, wherein the respective connection is formed by a seam and/or adhesive connection essentially extending along the adjacent side edges, side edge sections and/or end edges of the lining parts.

15. A method of manufacturing a lining element for repairing a connection area between a main pipe and a branch pipe, comprising the steps of: providing at least six flexible, expandable lining parts having a layer of resin-absorbing material wherein at least four lining parts comprise a branch pipe section and a rim pipe section and the at least two other lining elements comprise a main pipe section; and connecting the lining parts to form the lining element, wherein the at least six lining parts are connected to each other by means of at least six connections, wherein the respective connection is formed by a seam and/or adhesive connection essentially extending along the adjacent side edges, side edge sections and/or end edges of the lining parts, and wherein the lining parts having a branch pipe section and a rim pipe section are connected to each other by connecting both the side edges of adjacent branch pipe sections and the side edges and/or side edge sections of adjacent rim pipe sections in a continuous fashion.

16. A method of manufacturing a lining element for repairing a connection area between a main pipe and a branch pipe, comprising the steps of: providing at least six flexible, expandable lining parts having a layer of resin-absorbing material wherein at least four lining parts comprise a branch pipe section and a rim pipe section and the at least two other lining elements comprise a main pipe section; and connecting the lining parts to form the lining element, wherein the at least six lining parts are connected to each other by means of at least six connections, wherein the respective connection is formed by a seam and/or adhesive connection essentially extending along the adjacent side edges, side edge sections and/or end edges of the lining parts, and wherein each of the lining parts having a main pipe section is connected with a side edge thereof to at least two side edges and/or side edge sections of adjacent rim pipe sections and to at least one side edge and/or end edge of an adjacent rim pipe section in a continuous fashion.

17. A method of manufacturing a lining element for repairing a connection area between a main pipe and a branch pipe, comprising the steps of: providing at least six flexible, expandable lining parts having a layer of resin-absorbing material wherein at least four lining parts comprise a branch pipe section and a rim pipe section and the at least two other lining elements comprise a main pipe section; and connecting the lining parts to form the lining element, wherein the at least six lining parts are connected to each other by means of at least six connections, wherein the branch pipe sections of the lining element are connected by means of at least one connection with a branch pipe extension, comprising at least one flexible, expandable lining part.

18. The method according to claim 17, wherein the branch pipe extension is formed of a flat sheet material by rolling the flat sheet of material and establishing a connection along the longitudinal edges of the at least one lining part and by means of at least one seam and/or adhesive connection with the branch pipe sections, so that said seam and/or adhesive connection extends essentially radially in the circumferential direction with respect to the branch pipe extension.

* * * * *